Feb. 12, 1952　　　A. W. WALKER　　　2,585,290
ORIFICE PLATE FITTING

Filed Dec. 27, 1948　　　3 Sheets-Sheet 1

INVENTOR.
Arthur W. Walker
BY
Fishburn & Mullendore
ATTORNEYS

Feb. 12, 1952  A. W. WALKER  2,585,290
ORIFICE PLATE FITTING

Filed Dec. 27, 1948  3 Sheets-Sheet 2

INVENTOR.
Arthur W. Walker
BY
Fishburn & Mullendore
ATTORNEYS

Feb. 12, 1952 — A. W. WALKER — 2,585,290
ORIFICE PLATE FITTING
Filed Dec. 27, 1948 — 3 Sheets-Sheet 3

INVENTOR.
Arthur W. Walker
BY
Fishburn & Mullendore
ATTORNEYS

Patented Feb. 12, 1952

2,585,290

UNITED STATES PATENT OFFICE 2,585,290

ORIFICE PLATE FITTING

Arthur W. Walker, Tulsa, Okla., assignor of one-fifth to Harold M. Northcutt, Tulsa, Okla.

Application December 27, 1948, Serial No. 67,521

4 Claims. (Cl. 73—211)

This invention relates to orifice fittings for use in pipes for example gas flow lines with suitable meters for measuring flow in said lines and the fluid pressure at each side of the orifice for determining the differential pressure therebetween. More particularly the invention relates to a fitting in which the orifice plate may be changed or replaced without interrupting flow in the line.

The principal objects of the present invention are to provide an orifice fitting capable of selective stream-lined flow through the orifice or bypassed flow therearound; to provide an orifice fitting with a valve member having an orifice plate in a through flow channel of even size with flow channels in the body member whereby there are no obstructions in said channels whereby the flow through the fitting is completely streamlined; to provide a removable orifice plate in a plug type valve structure; to provide an orifice plate in a plug type valve in which the plug may be rotated to align the orifice with the normal flow channel or to seal normal flow channel and bypass the flow around the orifice plate; to provide an orifice fitting permitting access to the recess containing the orifice plate for removal and/or inspection thereof without interrupting flow through the line containing same; to provide means on the exterior of the orifice fitting for accurately aligning the orifice with the flow channel; to provide an orifice plate with a self-energizing seal for eliminating any pressure leak in the fitting around the plate, said seal being subject only to the differential pressure between the sides of the plate; to provide an orifice fitting with a lubricated valve member for carrying the orifice plate and unseating means for freeing the valve member if it should stick in the housing; and to provide a simple, sturdy, efficient orifice fitting with a stream-lined flow therethrough, capable of long periods of trouble-free operation at high pressures and permitting rapid changing or inspection of the orifice plate without interrupting the flow in the line.

In accomplishing these and other objects of the present invention, I have provided improved details of structure, the preferred forms of which are illustrated in the accompanying drawings, wherein.

Figure 1:
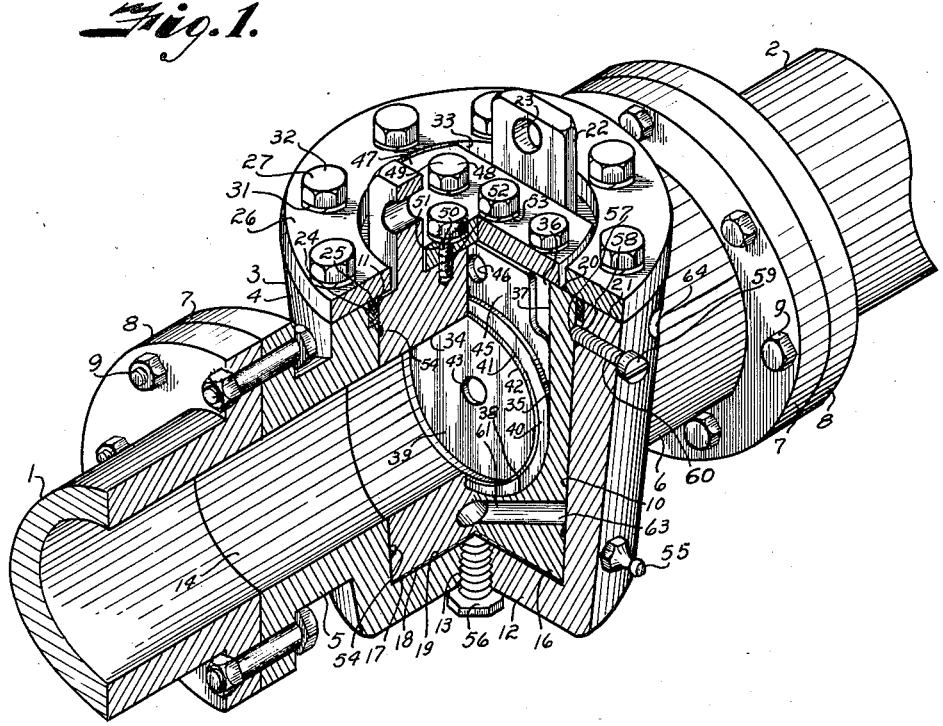
Fig. 1 is a perspective view of the orifice fitting, portions being broken away to better illustrate the structure thereof.

Referring more in detail to the drawings:

1 and 2 designate sections of a flow line, and 3 designates generally an orifice fitting connecting said sections. The orifice fitting preferably consists of a body 4 having aligned, laterally directed branches 5 and 6 on opposite sides thereof forming the inlet and outlet connections respectively. Each of said branches has flanges 7 on the outer ends thereof adapted to be secured to flanges 8 on the inlet section 1 and outlet section 2 of the flow line by suitable fastening devices 9, such as bolts or the like.

The housing 4 encloses a conical or other suitably shaped plug or core chamber 10, having an open upper end 11 and a bottom wall 12 provided with an internally threaded central opening 13. The axis of the plug chamber is at right angles to the outlet and inlet branches 5 and 6 and has communication with the respective passages 14 and 15 therein, said chamber being of larger diameter than the passages and extending above and below same. Rotatable in the chamber 10 is a tapered or other suitably shaped valve plug or core 16 for seating in said chamber, said plug extending into said chamber whereby the lower end 17 of said plug is spaced slightly as at 18 from the inner surface 19 of the bottom wall 12, the upper end 20 of the plug preferably being substantially in the same plane as the upper face 21 of the body 4, said plug being provided with spaced upwardly extending bosses 22 having suitable apertures 23 therein for receiving a bar or other suitable device for rotating the plug. The upper end of the chamber 10 is preferably counterbored as at 24 forming a recess for suitable packing 25 adapted to be compressed into said recess to form a seal between the upper ends of the chamber and plug by means of a cover plate 26 suitably secured to the upper face 21 of the body by suitably fastening devices such as cap screws 27 having threaded shanks extending through apertures 29 in the cover plate and screwed into threaded bores 30 in the body.

Lock washers 31 are preferably sleeved on the threaded shank for positioning between the cover plate and the heads 32 of the screws to prevent loosening of said screws when they are pulled down to secure the cover plate on the body. The cover plate 26 is provided with a bore 33 smaller in diameter than the diameter of the upper end of the chamber 10 whereby said cover plate extends over the upper end 20 of the plug 16 and engages same to retain the plug in seated condition on the inner faces of said chamber.

The plug 16 is provided with a through channel 34, preferably of the same diameter, size and shape as the passages 14 and 15 and adapted to be aligned therewith, whereby the adjacent ends of said channels and passages are even and flow therethrough is stream-lined, there being no obstructions to interfere with the flow from the passages to the channels. Intersecting the channel 34 and arranged transversely thereof is a recess or slot 35 preferably centrally located in the plug, said slot having a rectangular opening 36 at the upper end of the plug. The end walls 37 of the slot are parallel at their upper ends and terminate at the lower ends in a cylindrical surface 38 coaxial with the channel 34, and the opposite side walls are parallel for receiving in seating engagement therewith an orifice plate 39 and a pliable seal ring 40 which will deform under pressure to form a seal against escape of flow pressure between the plate and faces of the slot.

The orifice plate 39 is preferably shaped to closely engage the end walls and cylindrical lower portion of said slot. Integral with the plate and projecting outwardly from one side thereof is an annular ring 41 having an inner diameter 42 substantially the same as the diameter of the channel 34, the outer diameter and said ring preferably being of smaller radius than the radius of the cylindrical lower portion of the slot providing a space between the ring and the end wall and lower portion of the slot for location of the pliable seal ring 40. The width of the annular ring 41 and the orifice plate 39 are preferably slightly smaller than the width of the slot 35 whereby said orifice plate may be easily moved in and out of said slot. The pliable seal ring 40 is preferably provided with an annular groove 40a forming a U-shaped cross-section with spaced peripheral lips or edges 40b. The ring is of such width as to substantially engage the orifice plate and the face of the slot on the inlet side of the orifice plate when the opposite side of the orifice plate is engaged with the side face of the slot on the outlet side of said plate. Any leakage of fluid between the seal ring and face of the slot tends to apply pressure around the periphery of the seal ring 40 and such pressure spreads the lips of the U-shaped ring outwardly to increase the sealing effect between the plate and the faces of the slot. The plate 39 is preferably provided with an orifice 43 therein arranged coaxially with the channel 34, the outlet side of said orifice being provided with a conical counter-sunk portion 44, reducing the cylindrical portion of the orifice to the desired length. The orifice plate 39 includes an upwardly directed extension 45 having a hole 46 therein for facilitating removal of the plate from the slot. The rectangular opening 36 of the slot 35 is closed by a cover plate 47 secured to the upper end 20 of plug 16 by means of suitable cap screws 48 having heads 49 and threaded shanks 50, the shanks extending through apertures 51 in the cover plate and adapted to be screwed into threaded openings 52 in the upper end of the plug 16, lock washers 53 preferably being provided between the screw heads 49 and the cover plate 47 for retaining the screws in position when pulled down to secure the cover plate on the plug. Suitable gaskets or other sealing devices may be provided between the cover plate and the plug to prevent leakage from the slot.

In order to provide a complete seal of the plug in the chamber 10 and to prevent sticking or corrosion, grooves 54 are preferably provided on the tapered face of said plug, said grooves having communication with a suitable grease fitting 55 mounted on the body 4. Threaded into the internally threaded central opening 13 in the bottom wall 12 is a set-screw 56, the upper end of said screw preferably providing a rest for the plug 16. The set screw also serves for exerting pressure on the bottom of the plug 16 for unseating same should it become stuck.

It is desirable that the orifice 43 be accurately aligned with the passages 14 and 15 to eliminate any tendency to distort the stream-lined flow through the fitting. To facilitate the aligning of the orifice with the passages, the plug is provided with a conical seat 57 adapted to be aligned and engaged by the conical point 58 of a set-screw 59 threaded into an opening 60 in the body member. To provide continuous flow through the fitting and to prevent interruption of the flow during inspection and removal of the orifice plate, the plug 16 is preferably provided with a suitable bypass 61 arranged at right angles to the channel 34 through the plug. The bypass is illustrated as a passage extending under the slot 35 and having upwardly directed ends whereby the inlet 62 and outlet 63 of said bypass communicate with the passages 14 and 15 in the inlet and outlet branches 5 and 6 respectively. Any suitable bypass passage may be arranged in the plug whereby the inlet and outlet thereof are moved into communication with the passages 14 and 15 by rotation of the plug 16 before flow through the channel 34 and orifice 43 is interrupted by the rotation of the plug, the arrangement of the channel 34 and the bypass 61 being such that the ends of the bypass are completely sealed and no flow can occur therethrough when the orifice plate is arranged transversely of the passages 14 and 15, or in other words when the channel 34 is in alignment with said passages and a ninety degree rotation of the plug completely seals both ends of the channel 34 preventing any flow therethrough and aligns the bypass 61 with the passages 14 and 15.

In order to measure the pressure on each side of the orifice plate and to provide other flow information, suitable ports 64 are arranged in the body member 4 on either side of center for receiving suitable flow connections of an instrument such as an orifice meter (not shown), said ports opening to passages 65 and 66 in the body member which are so positioned as to align with apertures 67 and 68 respectively to provide communication from the channel 34 on the inlet and outlet side of the orifice plate with said ports 64 when the orifice 43 is aligned with the passages 14 and 15, the intersection of the apertures 67 and 68 with the channel 34 being spaced from the orifice plate the conventional distance for taking pressure readings in the flow line and operating an orifice plate meter as in conventional practice.

Figure 2:
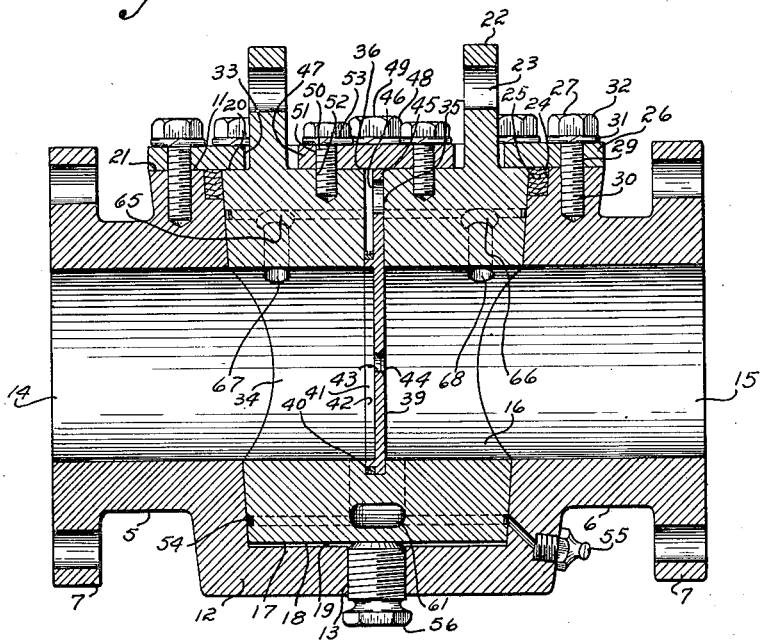
Fig. 2 is a longitudinal sectional view through the orifice fitting, the valve member being positioned for flow of fluid through the orifice therein.
Figure 3:
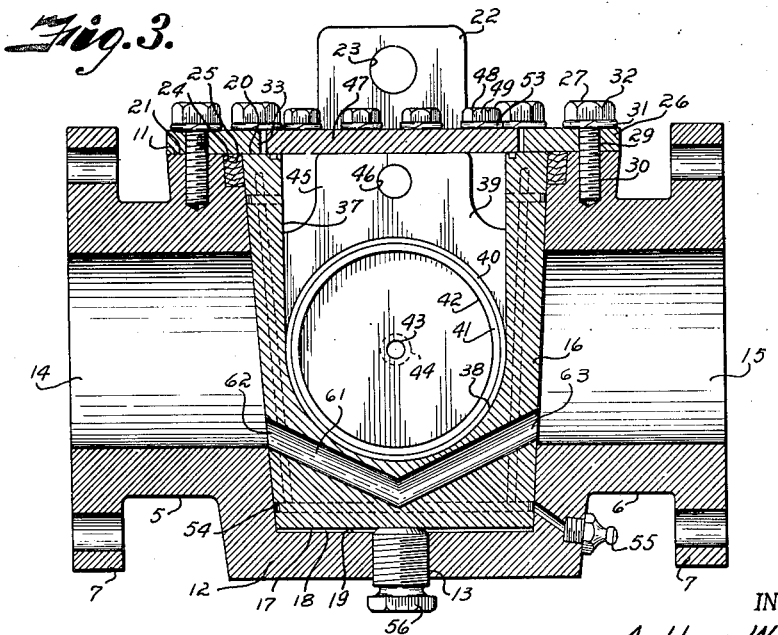
Fig. 3 is a longitudinal sectional view through the fitting with the valve member positioned for flow through the bypass, the orifice plate and recess therefor being sealed off from the flow through the fitting.
Figure 4:
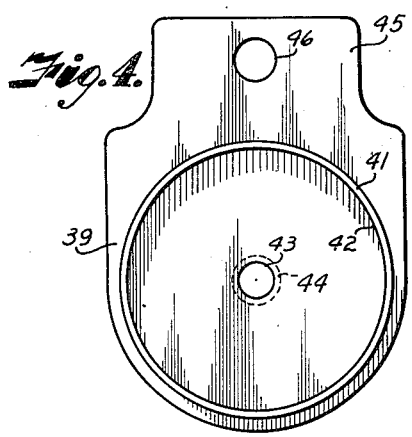
Fig. 4 is a front elevation of the orifice plate.
Figure 5:
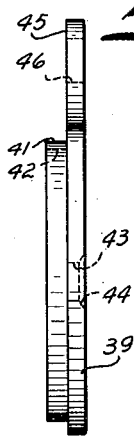
Fig. 5 is a side elevation of the orifice plate.
Figure 6:
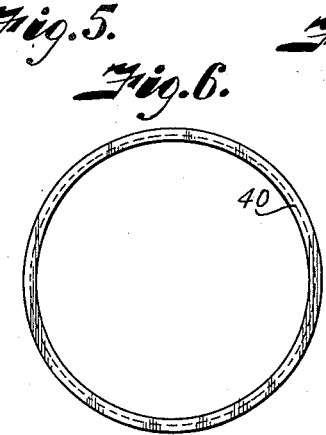
Fig. 6 is a front elevation of the plate seal ring for the orifice plate.
Figure 7:
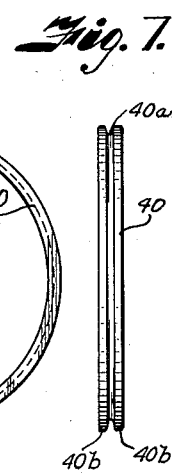
Fig. 7 is a side elevation of the plate seal ring.

With the orifice fitting constructed and assembled as described, mounted in a flow line, and having ports 64 connected by suitable pressure taps to a suitable orifice meter, the operation is as follows:

The valve plug or core 16 may be positioned as shown in Fig. 2 with the channel 34 arranged coaxially with the passages 14 and 15 and the orifice plate 39 at right angles to the line of flow whereby the orifice 43 is aligned with said passages. In this position, the orifice and orifice plate effect a differential pressure in the fluid between the sides of the plate, which differential pressure is transmitted to the orifice meter through the communicating apertures 67 and 68 and the passages 65 and 66 respectively. The tapered plug 16 is held in the conical chamber 10 of the body 4 by the cover plate 26, whereby the tapered walls of said plug engage the walls of the chamber to provide a seal therebetween preventing any leakage of fluid flowing through the fitting. Further seal is provided by lubricant in the grooves 54, assuring that all fluid entering the inlet passage 14 flows into the channel 34 and exerts pressure on the orifice plate 39, holding same in engagement with the opposite face of the recess 35, pressure also acting on the seal ring to spread the peripheral lips or edges thereof into sealing engagement with the plate and wall of the recess 35, thereby preventing any leakage of fluid around the orifice plate and assuring that all of the fluid flowing through the device must pass through the orifice 43. The annular ring 41 on the orifice plate makes continuous streamlined effect within the orifice slot and the plug 16 is aligned by means of the screw 59 seating in the seat 57 so the flow of the fluid through the orifice will not be distorted.

When it is desired to inspect and/or replace the orifice plate, the setscrew 59 is backed out of the conical seat 57, a suitable bar or the like is engaged in the apertures 23 of the bosses 22 on the upper end of the valve plug, and the plug rotated through the ninety degree arc or a quarter turn. In this position the bypass 61 is open and the ends thereof communicate with the passages 14 and 15 whereby flow of fluid is directed through said bypass and the orifice slot is maintained completely sealed off. During the operation of rotating the plug there is a short period when both bypass and channel 34 are in contact with the passages 14 and 15, and a continuous flow through the fitting at all times. If the plug is stuck in the chamber, the cover plate 26 is loosened then the setscrew 56 is rotated to screw same into the chamber 10, applying pressure to the plug for unseating same whereby it may be freely rotated. After the plug has been properly positioned for sealing off the orifice plate and channel 34 from the passages 14 and 15, the screws 48 are removed and the cover plate 47 removed to provide access to the slot 35 and orifice plate. The orifice plate can then be removed without being under pressure and the orifice inspected or changed as the occasion requires, a suitable plate being placed in the slot 35. The cover plate is then reapplied to cover the upper end of the recess and the screws inserted and tightened to seal the opening 36. The plug is then turned to align the channel 34 with the passages 14 and 15 and the setscrew 59 screwed into the seat 57 to accurately align the orifice whereby the pressure on the opposite sides of the orifice plate may be determined by the orifice meter.

Figure 8:
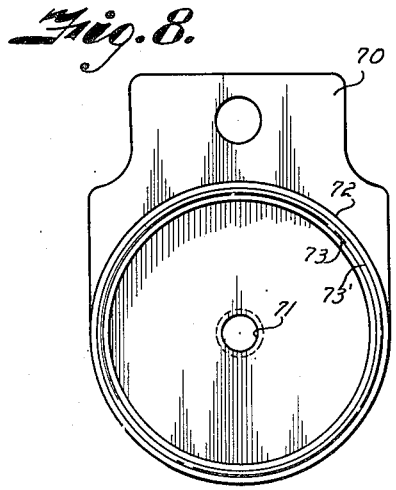
Fig. 8 is a front elevation of a modified form of orifice plate.
Figure 9:
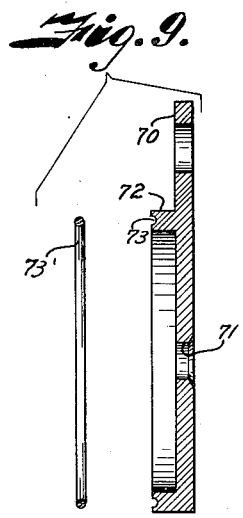
Fig. 9 is a sectional view through the modified form of orifice plate and seal ring in spaced relation.

The modified form of orifice plate and seal ring therefore as shown in Figs. 8 and 9 consists of a plate 70 shaped the same as the plate 39 and having an orifice 71 therein coaxial with the channel 34. Integral with the plate and projecting outwardly from one side thereof is an annular ring 72 having a grooved face 73 adapted to receive a seal ring 73' therein. When the plate is in the plug the face 74 of said plate engages the face of the slot on the outlet side of said plate and the seal ring engages the face of the slot on the inlet side of the plate to provide a complete seal preventing any leakage around said plate.

It is believed obvious that this structure provides a sturdy, simple, efficient orifice fitting having stream-lined flow therethrough and permitting rapid changing or inspection of the orifice plate without interrupting the flow in the flow line.

What I claim and desire to secure by Letters Patent is:

1. An orifice fitting comprising, a housing having a flow channel therethrough and a conical chamber in communication with the flow channel, a valve member seated in and rotatable in said chamber and having a through passage registrable with the housing flow channel and of even diameter therewith, a plate having an orifice therein mounted in the through passage of the valve member, an annular ring on the plate and substantially engaging the valve member around the through passage, a resilient ring sleeved on the annular ring and expandable responsive to fluid pressure for sealingly engaging the plate and valve member around the through passage for preventing escape of fluid around said orifice plate, the valve member having a slot providing access to the plate for removal thereof longitudinally of the valve member, adjustable means mounted in said housing and engageable with said valve member for accurately determining alignment of the orifice with the flow channel, and means for rotating the valve member for moving the through passage thereof out of registry with the flow channel and sealing the orifice plate from said flow channel.

2. An orifice fitting comprising, a housing having a flow channel therethrough and a valve chamber intersecting said flow channel, a valve member seated in and rotatable in said chamber and having a through passage alignable with the housing flow channel and of even diameter therewith, said valve member having a through bypass port disposed crosswise to the through passage, a ring secured on the housing and engaging the marginal edge of one end of the valve member for retaining the valve member in the valve chamber, said valve member having a slot opening from said end thereof and intersecting the through passage, a cover plate on the end of the valve member for closing the slot opening, a plate having an orifice therein removably mounted in the slot for positioning the orifice in alignment and substantially coaxially with the through passage of the plug, an annular ring on the plate substantially engaging the valve member around the through passage, a resilient ring sleeved on the annular ring and expandable responsive to fluid pressure for engaging the plate and valve member for preventing escape of fluid around said orifice plate, said valve member and housing having passages alignable simultaneously with the aligning of the through passage in the valve member with the flow channel for communicating the pressure on opposite sides of the orifice plate to the exterior of the housing, and means for moving the valve member for disaligning the through passage and flow channel and simultaneously aligning the bypass port with said flow channel to permit continuous flow through the housing with the orifice plate sealed from the flow channel.

3. An orifice fitting comprising, a housing having a flow channel therethrough and a valve chamber intersecting said flow channel, a valve member seated in and rotatable in said valve chamber and having a through passage alignable with the housing flow channel and of even diameter therewith, said valve member having a through bypass port disposed crosswise to the through passage, means on the housing for retaining the valve member in the valve chamber, said valve member having a slot opening from an end thereof and intersecting the through passage, a cover plate on said end of the valve member for closing the slot opening, a plate having an orifice therein removably mounted in the slot for positioning the orifice substantially coaxially of the through passage of the valve member, means expandable in response to fluid pressure for resiliently engaging the plate and valve member around the through passage for preventing escape of fluid around said orifice plate, adjustable means mounted in the housing and engageable with the valve member for accurately determining alignment of the orifice with the flow channel, said valve member and housing having passages alignable simultaneously with the aligning of the through passage in the valve member with the flow channel for communicating the pressure on opposite sides of the orifice plate to the exterior of the housing, and means for moving the valve member for disaligning the through passage and flow channel and simultaneously aligning the bypass port with said flow channel to permit continuous flow through the housing with the orifice plate sealed from the flow channel.

4. An orifice fitting comprising, a housing having a flow channel therethrough and a tapered bore intersecting said flow channel, a tapered plug seated in and rotatable in said bore and having a through passage alignable with the housing flow channel and of even diameter therewith, said plug having a through bypass port disposed crosswise to the through passage, a ring secured on the housing and engaging the marginal edge of the large end of the tapered plug for retaining the plug in the tapered bore, said plug having a slot opening from the large end thereof and intersecting the through passage, a cover plate on the end of the plug for closing the slot opening, a plate having an orifice therein removably mounted in the slot for positioning the orifice in alignment with and substantially coaxially of the through passage of the plug, a resilient ring sealingly engaging the plate and plug around the through passage for preventing escape of fluid around said orifice plate, means for applying and relieving force to the ends of the plug for seating and unseating same in the tapered bore of the housing, adjustable means mounted in the housing and engageable with the plug for accurately determining alignment of the orifice with the flow channel, said plug and housing having passages alignable simultaneously with the aligning of the through passage in the plug with the flow channel for communicating the pressure on opposite sides of the orifice plate to the exterior of the housing, and means for moving the plug for disaligning the through passage and flow channel and simultaneously aligning the bypass port with said flow channel to permit continuous flow through the housing with the orifice plate sealed from the flow channel.

ARTHUR W. WALKER.

REFERENCES CITED

The following references are of record in the file of this patent:

UNITED STATES PATENTS

| Number | Name | Date |
|---|---|---|
| 904,307 | Chandler | Nov. 17, 1908 |
| 1,068,280 | Simpson et al. | July 22, 1913 |
| 1,180,312 | Nordstrom | Apr. 25, 1916 |
| 1,972,151 | Link | Sept. 4, 1934 |
| 1,995,490 | Wilkinson | Mar. 26, 1935 |
| 2,007,036 | Cornell | July 2, 1935 |
| 2,352,368 | Burnett | June 27, 1944 |
| 2,462,493 | Hamer | Feb. 22, 1949 |